(12) United States Patent
Ott

(10) Patent No.: US 7,097,149 B2
(45) Date of Patent: *Aug. 29, 2006

(54) BISTABLE ELECTROMAGNETIC VALVE

(75) Inventor: Hubert Ott, Ravensburg (DE)

(73) Assignee: Harald Schrott, Lindau (DE)

(*) Notice: Subject to any disclaimer, the term of this patent is extended or adjusted under 35 U.S.C. 154(b) by 0 days.

This patent is subject to a terminal disclaimer.

(21) Appl. No.: 11/083,965

(22) Filed: Mar. 21, 2005

(65) Prior Publication Data
US 2005/0161626 A1  Jul. 28, 2005

Related U.S. Application Data

(63) Continuation of application No. 10/367,776, filed on Feb. 19, 2003, now Pat. No. 6,899,314.

(30) Foreign Application Priority Data

Feb. 19, 2002 (DE) ............... 102 06 778
Jul. 5, 2002 (DE) ............... 102 30 180

(51) Int. Cl.
F16K 31/02 (2006.01)

(52) U.S. Cl. ............... 251/129.14; 251/129.15; 251/129.21; 335/229; 335/234

(58) Field of Classification Search ........... 251/129.01, 251/129.02, 129.14, 129.15, 129.21; 335/229–234
See application file for complete search history.

(56) References Cited

U.S. PATENT DOCUMENTS

| 4,819,693 A | * | 4/1989 | Rodder | 137/625.4 |
| 5,889,646 A | * | 3/1999 | Strauss | 361/194 |
| 6,899,314 B1 | * | 5/2005 | Ott | 251/129.14 |

FOREIGN PATENT DOCUMENTS

| DE | 37 18 490 C2 | 2/1997 |
| DE | 197 42 283 A1 | 4/1999 |
| DE | 196 36 781 C2 | 2/2000 |
| DE | 199 14 971 A1 | 3/2000 |
| DE | 41 17 958 C2 | 5/2000 |
| DE | 199 22 089 A1 | 11/2000 |
| DE | 199 22 466 A1 | 12/2000 |
| DE | 100 37 251 A1 | 2/2002 |
| DE | 199 22 466 C2 | 6/2002 |
| EP | 1 054 200 A2 | 11/2000 |
| EP | 1 054 200 A3 | 10/2001 |

* cited by examiner

Primary Examiner—David J. Walczak
Assistant Examiner—Peter deVore
(74) Attorney, Agent, or Firm—Breneman & Georges

(57) ABSTRACT

A bistable electromagnetic valve is proposed, which is to be used in refrigerant circuits. The valve can be produced at particularly low outlay and at the same time is reliably leaktight. This is achieved, according to the invention, in that the valve chamber (7) is formed within a control coil (3) by a cylindrical tubular body (2) which extends at least beyond the pole pieces (5, 6) inserted into the cylindrical tubular body (2).

26 Claims, 3 Drawing Sheets

BISTABLE ELECTROMAGNETIC VALVE

This Application is a continuation of U.S. application Ser. No. 10/367,776 filed Feb. 19, 2003, now U.S. Pat. No. 6,899,314.

BACKGROUND OF THE INVENTION

1. Field of the Invention

The invention relates to a bistable electromagnetic valve characterized by a valve chamber (7) arranged within a control coil (3) and the outer wall of the valve chamber (7) that is formed within the control coil (3) by a cylindrical tubular body (2) which extends at least beyond the pole pieces (5,6) inserted into the cylindrical tubular body (2) wherein at least one end of the tubular body (2) forms a pipe connection (11, 20) for a fluid.

2. Description of the Related Art Including Information Disclosed Under 37 C.F.R. 1.97 and 1.98

Prior art valves of this type are used, for example, in refrigerant circuits, such as are described in the publications DE 37 18 490 or BP 10 54 200.

In such valves, a bistable situation is achieved by permanent magnets being arranged outside the valve housing, next to the valve chamber or next to the pole pieces, so that the valve body has, at the pole pieces, two end positions in which it is held by these permanent magnets.

High requirements in terms of leaktightness and long-term stability are placed on such valves. Furthermore, as is customary, there is the requirement to produce such a valve as cost-effectively as possible.

BRIEF SUMMARY OF THE INVENTION

The object of the invention is, therefore, to propose a valve which can be produced at little outlay and is reliably leaktight.

This object is achieved, starting from a valve for a refrigerant circuit of the type mentioned in the field of the invention characterized by a valve chamber (7) arranged within a coil (3) and the outer wall of the valve chamber (7) that is formed within the coil (3) by a cylindrical tubular body (2) which extends at least beyond the pole pieces (5,6) inserted into the cylindrical tubular body (2) wherein at least one end of the tubular body forms a pipe connection (11, 20) for a fluid.

Advantageous designs and developments of the invention are possible as a result of the features described in the following description of the invention including drawings and dependent claims.

Accordingly, a valve according to the invention is distinguished in that the valve chamber is arranged within the control coil and the outer wall of the valve chamber within the control coil is formed by a cylindrical tubular body. The tubular body in this case extends at least beyond the pole pieces inserted into the cylindrical tubular body. The valve of the invention is further distinguished in that at least one end of the cylindrical tubular body is used as a pipe connection for a fluid. Along with a minimum number of sealing points, the invention provides the advantages of easy fabrication since the pipe connection for the cylindrical tubular body is present at the end of the cylindrical tubular body.

This means that, in contrast to conventional valves, the pole pieces do not have the connections, but, instead, the latter are simply introduced into the tubular body. Leaktightness problems between the tubular body and the pole pieces are consequently prevented completely at the lowest possible outlay.

The tubular body, and thus also the valve chamber, are advantageously arranged inside the control coil.

In a development of the invention, the tubular body is designed to be of a length such that it extends at least as far as the end faces of the control coil. Thus, even with the control coil put in place, the tubular body is easily accessible. Moreover, the tubular body can be adapted to the inside diameter of the coil, without connection points having to be taken into account.

Furthermore, in this case, fluid connections of the valve can be attached in a particularly simple way to the cylindrical tubular body accessible outside the control coil.

A particularly simple design of such a fluid connection arises in that at least one end of the tubular body is used as a tubular connection for the fluid. In addition to a minimal number of sealing points, this, in turn, affords the advantage of extremely favorable manufacture, since the tubular connection is formed in the simplest instance by one end of the cylindrical tubular body which is already present in any case.

Preferably, further valve components are inserted into the tubular body. Those which come under consideration in this case are, for example, the permanent magnets necessary for bistable functioning or else filter elements in order to filter dirt particles or, in general, impurities out of the fluid. In principle, however, further valve components may also be integrated readily into the cylindrical tubular body.

Dirt filters, which may be designed, for example, as a sieve tube or else as a magnetic filter element for the separation of magnetic or magnetizable particles, keep impurities away from the valve body and the valve seat, so that the wear of these components is effectively reduced. This results, in turn, in a high long-term stability of the valve. It is pointed out particularly, at the same time, that such valves are used conventionally in closed fluid circuits, so that the filter capacity has to be sufficient merely for once-only purification of the fluid volume located in the circuit.

Moreover, it is advantageous to fix at least one of the said valve components to the inside of the tubular body at least in the axial direction. The valve thereby forms a unit capable of being handled in the unconnected state, without the possibility of any valve components falling out of the cylindrical tubular body on the end face.

Axial fixing can be achieved, for example, by the corresponding valve component being pressed together with the tubular body inside the latter. Such pressing can be implemented at little outlay, for example, by pressure on the tubular body from outside, and, in particular, even a plurality of valve components can be fixed in one operation. Furthermore, by pressing, a valve component can also be fixed reliably in the radial direction.

In a simple embodiment, even a peripheral bead or a nose pressed in on the outside may be sufficient for axial fixing. Thus, for example, all the valve components may be designed in such a way that they have in each case an abutment against one another, so that, by a bead or a nose being applied on both sides, the complete valve unit pushed into the tubular body is both fixed in the tubular body and secured against relative displacement by the mutual abutments.

In a further advantageous embodiment, an additional inner tube is pushed into the tubular body at least on one side of the valve chamber. What is known as a 3/2-way valve can also be produced in this way. The space between the inner tube and the cylindrical tubular body accordingly serves as an inflow line, in which case a duct to the inner valve chamber must be formed on or in the corresponding pole piece. In the simplest instance, such a duct may be formed by a circumferential recess on the pole piece. The inner tube itself then forms an outflow for the fluid in one switching position of the valve body. In the other switching position, the opposite end of the tubular body can be used as an outflow.

BRIEF DESCRIPTION OF THE DRAWINGS

An exemplary embodiment of the invention is illustrated in the drawing and is explained in more detail below with reference to the figures of which, in particular.

DETAILED DESCRIPTION OF THE INVENTION

Figure 1:
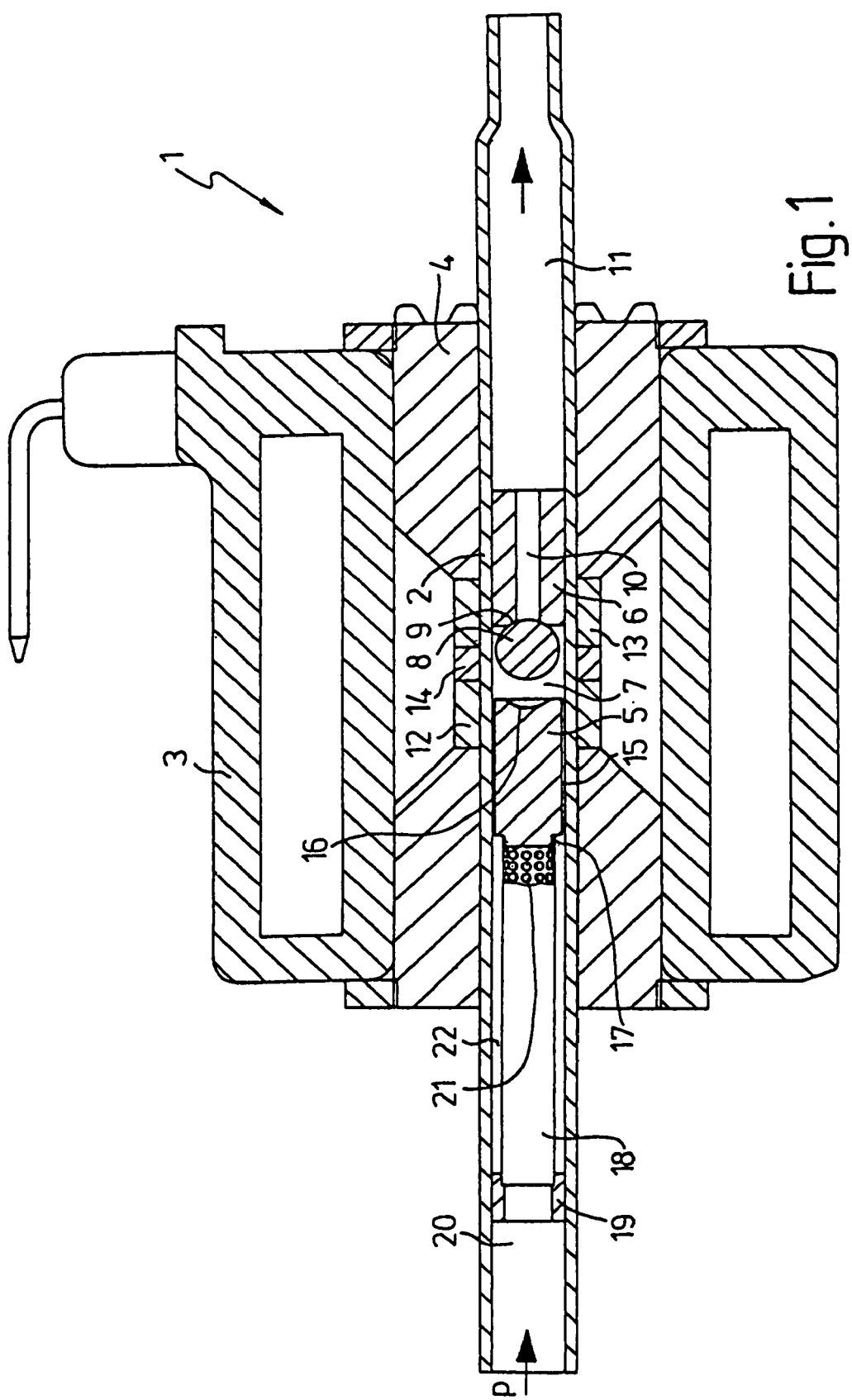
FIG. 1 shows a cross section through a 2/2-way valve according to the invention.

The valve 1 according to FIG. 1 comprises a cylindrical tubular body 2 according to the invention as a valve housing which passes completely through a control coil 3. Adapter pieces 4 in this case ensure a good fit in the valve housing 2 and are designed at the same time as flux guide elements for an increased magnetic flux through pole pieces 5, 6 and through a valve chamber 7. Inside the valve chamber 7 is located a spherical valve body 8 which, in the position illustrated, lies on the spherical seat 9 of the pole piece 6 and at the same time closes a passage bore 10. The passage bore 10 issues into the outflow line 11 of the valve 1.

The tubular body 2 extends into the space outside the coil 3 and therefore also beyond the pole pieces 5, 6.

Annular magnets 12, 13 lying outside the tubular body 2 ensure the bistable behavior of the valve and are fixed by means of a spacer ring 14 between the adapter pieces 4.

The pole piece 5 has in its outer circumference recesses or flattenings which produce fluid ducts 15 between the pole piece 5 and the tubular body 2 into the inside of the valve chamber 7. The fluid ducts could also be implemented by bores in the pole piece 5, the inflow-side orifices of said bores lying in the annular region between a tubular sieve 18 and the outer wall of the tubular body 2. The pole piece 5 has, furthermore, a spherical seat 16, in order to bring about a defined end position of the valve body 8 in the second end position, not illustrated.

The pole piece 5 comprises a step 17, onto which the tubular sieve 18 is pushed. At the opposite end, the tubular sieve 18 is fixed in a magnetic filter 19 designed as an annular magnet. The tubular region of the tubular body 2 in which the tubular sieve 18 and the magnetic filter 19 are located serves as an inflow line 20 for the corresponding fluid, that is to say, in particular, for refrigerant.

Inflowing fluid (see arrow P) passes first into the region of the magnetic filter 19, which is designed as an annular magnet, and comes directly into contact with the fluid. As a result, magnetic or magnetizable dirt particles are already fixed permanently to the magnetic filter 19 at a considerable distance from the valve chamber 7.

The fluid subsequently passes into the inside of the tubular sieve 18 which is closed on the end face, at the opposite end, by the pole piece 5 or its step 17. The fluid flow accordingly has to take place radially outward in the tubular sieve 18, dirt particles larger than the sieve orifices 21 of the tubular sieve 18 being retained in the interior of the tubular sieve 18. Thus, only purified fluid passes into the exterior 22 between the tubular sieve 18 and the tubular body 2. The fluid passes from there, via the fluid ducts 15, into the inside of the valve chamber 7.

The flow, of course, takes place only with the valve open, that is to say in the switching position in which the valve body 8 lies on the spherical seat 16 and the passage bore 10 is released.

A valve 1 according to the invention can easily be built into a fluid circuit, for example a refrigerant circuit, which, as a consequence of manufacture, contains dirt particles which are not compatible with conventional refrigerant valves and cause malfunctions.

The use of the valve 1 is aimed at closed fluid circuits which remain closed after manufacture over the useful life of the valve 1. The filter capacity of the filter system consisting of the tubular filter 18 and of the magnetic filter 19 must in this case be designed in such a way that once-only complete purification of the fluid located in the circuit, without clogging, can follow.

In this way, that is to say by the use of a filter 18, 19 in the inflow line 20 of the tubular body 2 and, in particular, by the direct arrangement next to the valve chamber 7, an introduction of dirt into the valve chamber 7 is reliably ruled out to an extent such that permanently leaktight and low-wear functioning of the valve 1 can be ensured.

Figure 2:
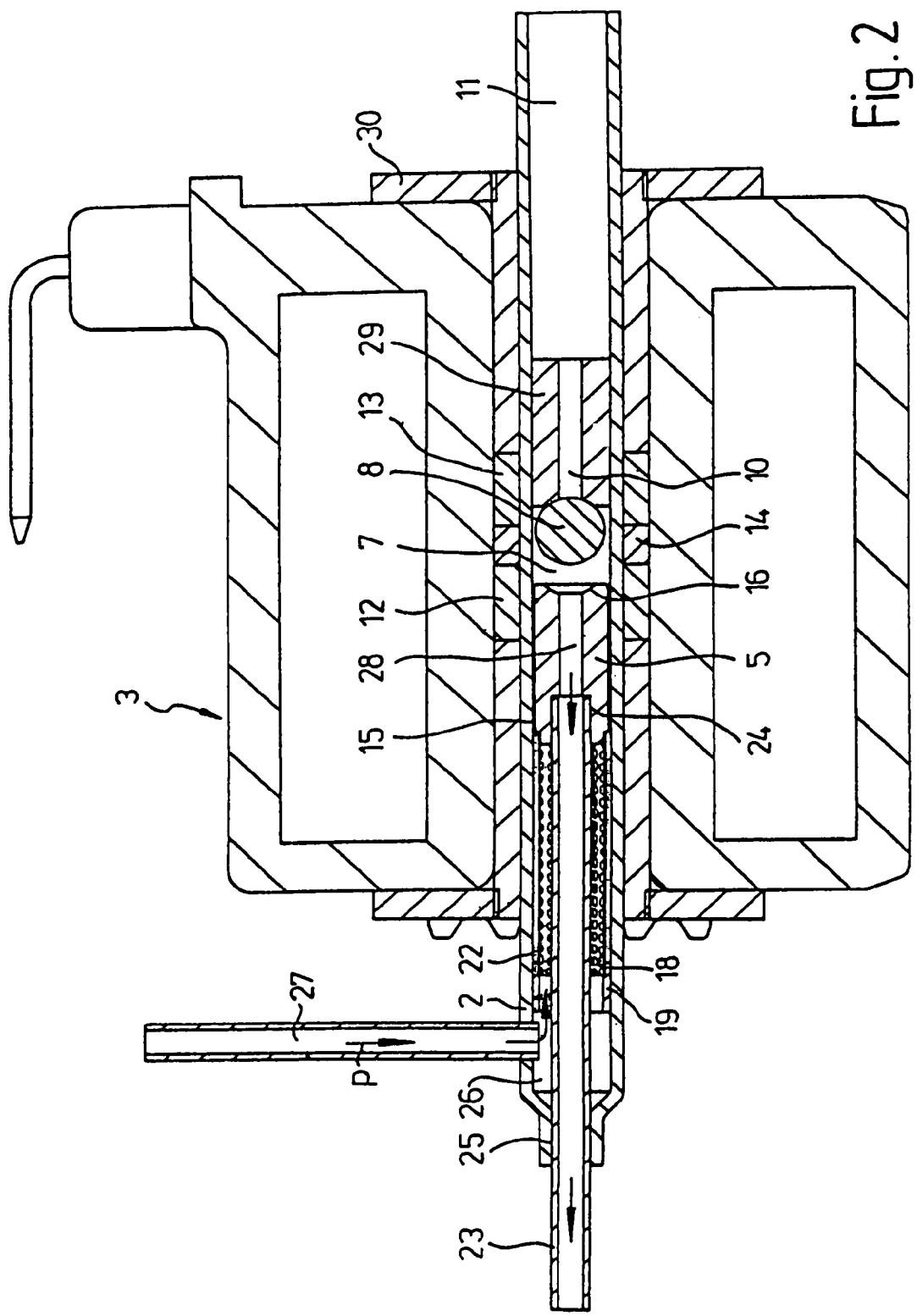
FIG. 2 shows a cross section through a 3/2-way valve according to the invention.
Figure 3:
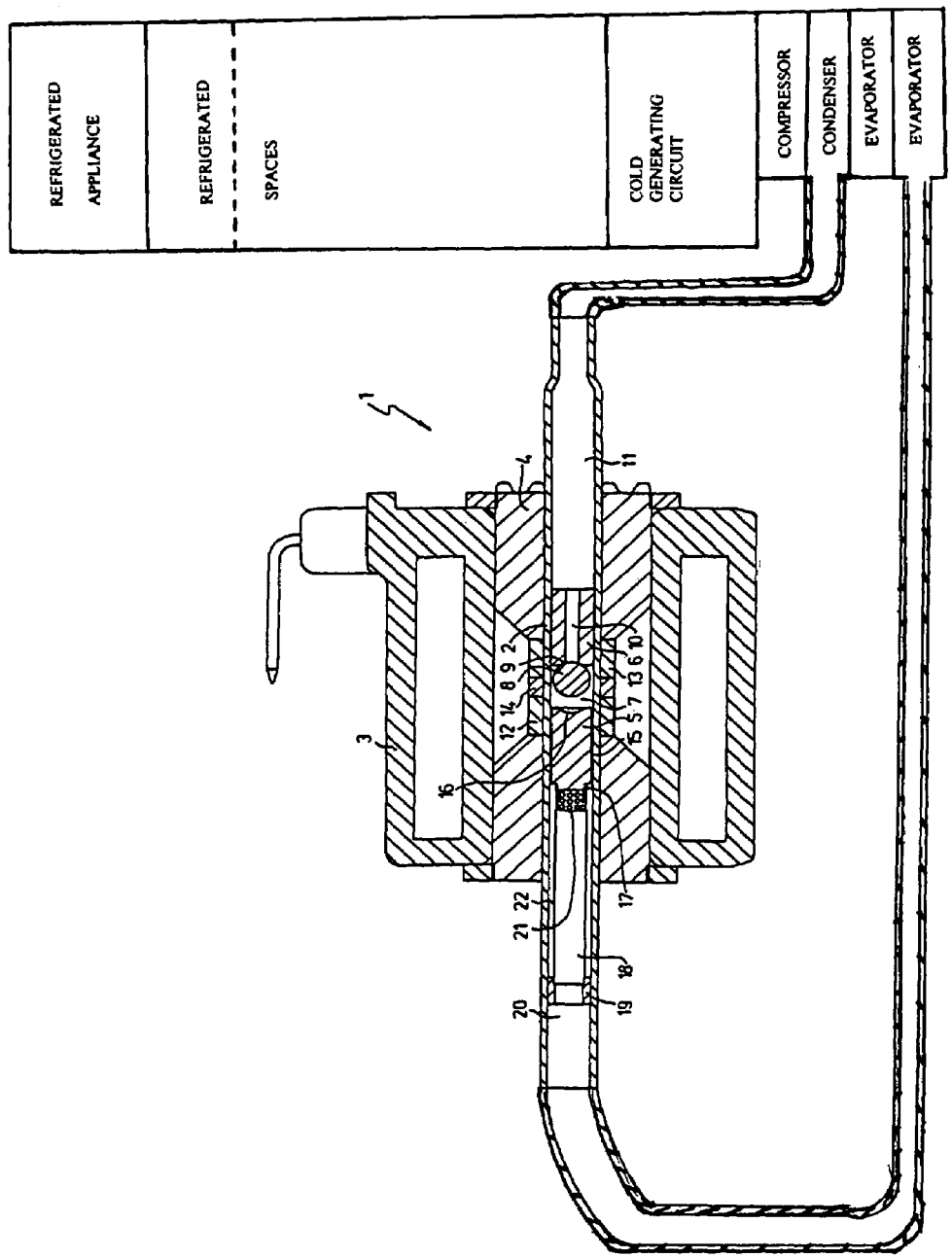
FIG. 3 shows a cross section of a 2/2-way valve schematically connected to a refrigerated appliance having refrigerated spaces, a cold generating circuit including a compressor, condenser and evaporators

FIG. 2 corresponds essentially to the abovementioned exemplary embodiment, in this case, by contrast, a second tubular outflow line 23 leading into the inside of the tubular body 2 as far as the pole piece 5 and being fixed there in a leaktight manner in a corresponding bore 24. The tubular body 2 and the outflow line 23 are closed off relative to one another, for example pressed or soldered, in a leaktight manner at a sealing point 25.

An interspace 26, to which an inflow line 27 is connected, is thus obtained between the outflow line 23 and the tubular body 2. The inflow line 27 may, for example, be soldered in a corresponding orifice of the tubular body 2.

In this embodiment, the pole piece 5 also comprises a passage bore 28 connecting the valve chamber 7 to the interspace 26 via the fluid ducts 15.

The fluid or refrigerant can pass in the direction of the arrow P into the interspace 26 and from there through the magnetic filter 19 into the in this case annular interior between the tubular sieve 18 and the outflow line 23. The fluid subsequently flows radially outward into the exterior 22 between the tubular sieve 18 and the tubular body 2, from where it passes via the fluid ducts 15 into the valve chamber 7.

The fluid then flows out either via the outflow line 23 or via the outflow line 11, depending on the switching position of the valve body 8. In the switching position illustrated, the passage bore 28 of the pole piece 5 is open, that is to say outflow takes place via the outflow line 23.

By means of a control pulse from the control coil 3, the valve body 8 can be brought onto the opposite spherical seat 16, with the result that the passage bore 28 is closed and the passage bore 10 is opened. In this switching position described, but not illustrated, the fluid flows out via the outflow line 11.

Instead of the adapter pieces 4 which have a conical outflow surface inside the control coil 3, in the present case sleeve-shaped flux guide plates 29, which completely fill the interspace between the tubular body 2 and the control coil 3, are provided for guiding the magnetic flux inside the control coil 3. The flux guide plates 29 are in each case connected to a closing plate 30 which itself is connected to what are known as yoke plates, not illustrated in any more detail, or merges into these. The flux guide plates 29 may be punched, bent or wound together with the closing plate 30 and the entire yoke plate arrangement, not illustrated in any more detail, out of a flat material.

LIST OF REFERENCE SYMBOLS

1 Valve
2 Tubular body
3 Control coil
4 Adapter pieces
5 Pole piece
6 Pole piece
7 Valve chamber
8 Valve body
9 Spherical seat
10 Passage bore
11 Outflow line
12 Annular magnet
13 Annular magnet
14 Spacer ring
15 Fluid duct
16 Spherical seat
17 Step
18 Tubular sieve
19 Magnetic filter
20 Inflow line
21 Sieve orifice
22 Exterior
23 Outflow line
24 Bore
25 Sealing point
26 Interspace
27 Inflow line
28 Passage bore
29 Flux guide plate
30 Closing plate

What is claimed is:

1. A bistable electromagnetic valve with a valve chamber arranged between two pole pieces and with a valve body which is displaceable therein between two end positions and which is designed as an magnet armature for at least one permanent magnet and for at least one control coil, wherein the improvement comprises said valve chamber (7) is arranged within the control coil (3) in which the outer wall of the valve chamber (7) is formed within the control coil (3) by a cylindrical tubular body (2) which extends at least beyond the pole pieces (5, 6) inserted into the cylindrical tubular body (2) said cylindrical tubular body having at least one fluid connection on said cylindrical tubular body.

2. The bistable electromagnetic valve according to claim 1 wherein said cylindrical tubular body extends at least as far as the end faces of the control coil (3).

3. The bistable electromagnetic valve of claim 1 or 2 wherein valve components are disposed inside the cylindrical tubular body (2).

4. The bistable electromagnetic valve of claim 1 wherein said cylindrical tubular body extends to the front of the control coil (3).

5. The bistable electromagnetic valve of claim 1 wherein valve components (18) are inserted into the cylindrical tubular body (2).

6. The bistable electromagnetic valve of claim 1 or 2 further comprising a dirt filter (18) inserted into the cylindrical tubular body (2).

7. The bistable electromagnetic valve of claim 1 wherein at least one valve component (5, 6, 18) is fixed inside of the cylindrical tubular body (2) in the axial direction.

8. The bistable electromagnetic valve of claim 1 or 2 wherein at least one valve component (5, 6, 18) is pressed together with the tubular body (2).

9. The bistable electromagnetic valve of claim 1 or 2 wherein at least one bead or nose is pressed into the cylindrical tubular body (2) for the axial fixing of a valve component (5, 6, 18).

10. The bistable electromagnetic valve of claim 1 wherein an inner tube (23) is pushed into the tubular body (2) on one side of the valve chamber (7).

11. The bistable electromagnetic valve of claim 1 or 2 further comprising a cold-generating circuit for a refrigerating system having a plurality of refrigerating spaces, a compressor, a condenser, a plurality of evaporators which are assigned to at least one of the refrigerating spaces wherein said bistable electromagnetic valve connects the condenser to one or more of the evaporators according to predetermined operating states.

12. The bistable electromagnetic valve of claim 1 or 2 further comprising a refrigerated appliance with a cold-generating circuit wherein said refrigerated appliance includes a cold-generating circuit having said bistable electromagnetic valve.

13. A method for producing a bistable electromagnetic valve with a valve chamber arranged between two pole pieces and with a valve body displaceable therein between two end positions and which is designed as a magnetic armature for at least one permanent magnet and for at least one control coil wherein the improvement comprises the step of introducing valve components (5,6, 18) into a substantially cylindrical tubular body (2) containing said valve chamber extending out at least as far as the end faces of the control coil and using said substantially cylindrical tubular body (2) as the outer wall of the valve chamber (7) and arranging said pole pieces (5,6) completely within said substantially cylindrical tubular body (2) and providing a fluid connection on at least one end of said substantially cylindrical tubular cylindrical body.

14. A bistable electromagnetic valve article of manufacture comprising:
    (a) a control coil housing having a first end face and a second end face;
    (b) a substantially cylindrical tubular body disposed within said control coil housing having ends extending at least as far as said first end face and said second end face of said control coil housing, said substantially cylindrical tubular body having at least one of said ends having a fluid connection;
    (c) a valve chamber disposed in said substantially cylindrical tubular body intermediate the first end face and said second end face of said control coil housing;
    (d) a first pole piece disposed in said substantially cylindrical tubular body intermediate said valve chamber and one of said ends of said substantially cylindrical tubular body;
    (e) a second pole piece disposed in said substantially cylindrical tubular body intermediate said valve chamber and the other of said ends of said substantially cylindrical tubular body; and (f) a magnet disposed outside said substantially cylindrical tubular body adjacent to said valve chamber.

15. A bistable electromagnetic valve with a valve chamber arranged between two pole pieces and with a valve body which is displaceable therein between two end positions and which is designed as a magnet armature for at least one permanent magnet and a control coil wherein the improvement comprises a cylindrical tubular body (2) forming an outer wall of said valve chamber (7) extending at least beyond pole pieces (5,6) inserted into said cylindrical tubular body (2) and wherein at least one end of said cylindrical tubular body (2) provides a pipe connection (11, 20) for a fluid.

16. The valve according to claim 15 wherein valve components (5,6,18) are inserted into the cylindrical tubular body (2).

17. The valve of claim 15 or 16 wherein said cylindrical tubular body is disposed at least partially within said control coil.

18. The valve of claim 15 or 16 wherein said cylindrical tubular body (2) extends at least to the front of said control coil (3).

19. The valve of claim 15 or 16 further comprising a dirt filter (18) disposed in said cylindrical tubular body (2).

20. The valve of claim 16 wherein at least one of said valve components (5, 6, 18) is fixed to the inside of said cylindrical tubular body (2) in an axial direction.

21. The valve of claim 16 wherein at least one of said valve components (5, 6, 18) is pressed together with said cylindrical tubular body (2) inside said cylindrical tubular body (2).

22. The valve of claim 16 wherein at least one bead or nose is pressed into said cylindrical tubular body (2) for an axial fixing of at least one of said valve components (5, 6, 18).

23. The valve of claim 15 or 16 further comprising an inner tube (23) disposed on at least one side of the valve chamber (7) in said cylindrical tubular body (2).

24. The valve of claim 15 or 16 further comprising a cold generating circuit for a refrigerating system with at least one refrigerating space, a compressor, a condenser, at least one evaporator assigned to said at least one refrigerating space and at least one electrical control valve for connecting the condenser to said at least one evaporator according to predetermined operating modes.

25. The valve of claim 15 or 16 further comprising a domestic appliance such as a refrigerator or freezer with a cold generating circuit.

26. A method for producing a bistable electromagnetic valve with a valve chamber arranged between two pole pieces and with a valve body displaceable therein between two end positions and which is designed as a magnet armature for at least one permanent magnet and for at least one control coil, wherein the improvement comprises the step of using a cylindrical tubular body (2) as the outer wall of the valve chamber (7) and forming at least one end of said cylindrical tubular body (2) as a pipe connection (11, 20) for a fluid.

* * * * *